3,574,142
CERAMIC MATERIAL FOR MAGNETOHYDRO- DYNAMIC GENERATOR ELECTRODE

David Yerouchalmi, Le Mesnil-St.-Denis, France, assignor to Commissariat a l'Energie Atomique, Paris, France
No Drawing. Filed Jan. 24, 1969, Ser. No. 793,906
Claims priority, application France, Jan. 24, 1968, 137,310
Int. Cl. H01b 1/06; G21d 7/02
U.S. Cl. 252—520                                6 Claims

ABSTRACT OF THE DISCLOSURE

Conductive ceramic material which is intended for the fabrication of MHD generator electrodes and affords resistance to the corrosive action of the alkaline seed is the gas which passes through the generator duct. Said ceramic material consists mainly of an alkaline-earth zirconate containing an additive which i selected from chromium oxide and alumina.

---

This invention relates to electrically-conductive ceramic materials which can be utilized for the fabrication of electrodes of magnetohydrodynamic (MHD) generators.

During operation, the electrodes of the type at present employed in MHD generators have a hot frontal face which is in contact with the hot ionized gases as said gases flow through the generator duct whereas said electrodes are cooled by means of a cooling agent which is circulated in the vicinity of the opposite face. A single electrode is often made up of a number of ceramic components separated by plates formed of heat-resistant metals which facilitate the transmission of heat between the hot face and the cooled face.

The use of a number of different refractory ceramic materials has already been proposed for the fabrication of electrodes of the type referred-to. Such ceramic materials are intended to withstand high operating temperatures and must be capable of affording resistance to electrolytic and electrochemical phenomena which are caused by the flow of current. These materials must also have high electron conductivity at operating temperatures in order to prevent polarization of electrodes in an MHD generator which generates direct current.

It has been found that, when employing electrodes made of conventional ceramic materials, the front face of the material which is in contact with the hot gases supplied to the MHD generator undergoes a process of degradation. The corrosion phenomena which are observed appear to be essentially due to the alkali metal seeding material which is added in these gases to cause ionization. In fact, the degree of damage caused is particularly marked at the level at which, as a result of cooling of the electrodes, the temperature of the ceramic component is such as to cause liquefaction of the alkali metal used for seeding the hot gases.

The present invention is directed to the basic concept of a ceramic material which conforms to essential requirements more effectively than was the case with ceramic materials of the prior art and, in particular, which can serve for the fabrication of electrodes for magnetohydrodynamic generators without being subjected in practice to corrosive attack by the alkali metals employed as seeding material in the ionized gases which are supplied to these generators.

The invention proposes a ceramic material which is suitable for the fabrication of MHD generator electrodes and which essentially consists of an alkaline-earth zirconate containing an additive which is selected from chromium oxide $Cr_2O_3$ and alumina $Al_2O_3$. The zirconate is preferably strontium zirconate $SrO\ ZrO_2$.

The molar proportion of additive is advantageously comprised between 0.5 and 10% and preferably between 1 and 5%.

In accordance with a secondary property of the invention, the ceramic material contains both a first additive consisting of $Cr_2O_3$ or $Al_2O_3$ and a second additive consisting of BaO, CaO or SrO.

The presence of these additives makes it possible to endow the refractory oxide with high electron conductivity and they can consequently be employed in the preparation of conductive electrodes for MHD generators. The properties of the alkaline-earth zirconates are nevertheless retained. In point of fact, these refractory oxides have proved to be highly resistant to the corrosive action of alkali metals even in the liquid state and to electrochemical phenomena resulting from the presence of alkali seeding material and from the flow of direct current which is generated.

The addition of chromium oxide ($Cr_2O_3$) or of alumina ($Al_2O_3$) in small proportions (approximately 2 mole percent, for example) makes it possible to endow these oxides with good electron conductivity which is even further improved by the addition of small quantities (approximately 1 to 2 mole percent) of an alkaline-earth oxide, CaO, BaO or SrO, the effect of the oxide last mentioned being to assist thermionic emission.

The ceramic material in accordance with the invention can be prepared by melting or sintering the oxides at high temperature in accordance with known methods of manufacture of ceramic materials.

Similar results are obtained when a proportion of 1 to 5 mole percent of chromium oxide or alumina, for example, is added to the zirconate. The conductivity is improved if the zirconate contains a slight excess of alkaline-earth oxide with respect to the stoichiometric proportion. However, in addition to the chromium oxide or alumina, there is preferably added to the zirconate a proportion comprised between 1 and 5 mole percent for example of the oxide of an alkaline-earth metal which is different from that of the basic zirconate. For example, in the case of strontium zirconate, the alkaline-earth oxide chosen is lime.

The best results are obtained when the zirconate employed is strontium zirconate. This latter appears in particular to be more stable than the other alkaline-earth zirconates under utilization conditions. Moreover, if the additive is chromium oxide, strontium zirconate seems to prevent the evaporation of this oxide.

What we claim is:
1. A ceramic part for an electrode of a MHD generator consisting essentially of an alkaline-earth zirconate containing between 0.5 and 10 mole percent of an additive selected from chromium oxide $Cr_2O_3$ and alumina $Al_2O_3$.
2. Ceramic material in accordance with claim 1, said additive in the refractory oxide being between 1 and 5 mole percent.

3. Ceramic material in accordance with claim 1, the zirconate being strontium zirconate $SrOZrO_2$.

4. Ceramic material in accordance with claim 1, said part additionally containing an oxide of an alkaline-earth metal different from said zirconate 5. Ceramic material in accordance with claim 4, said alkaline-earth oxide being between 0.5 and 10 mole percent.

6. Ceramic material in accordance with claim 5, said alkaline-earth oxide being between 1 and 5 mole percent.

References Cited
UNITED STATES PATENTS

| | | | |
|---|---|---|---|
| 3,149,253 | 9/1964 | Luebke | 252—518 |
| 3,414,418 | 12/1968 | Hubble et al. | 106—57 |
| 3,475,352 | 10/1969 | Barbier et al. | 252—520 |
| 3,490,067 | 1/1970 | Foex | 252—518 |

DOUGLAS J. DRUMMOND, Primary Examiner

U.S. Cl. X.R.

106—57; 252—52; 310—11